United States Patent [19]

Georlette et al.

[11] 4,356,226

[45] Oct. 26, 1982

[54] LAMINATED STRUCTURE FOR FURNISHING, COMPRISING AT LEAST ONE DECORATIVE LAYER COMBINED WITH A SUPPORT

[75] Inventors: Pierre Georlette, Hamme-Mille; Rene Bouteille, Braine-l'Alleud, both of Belgium

[73] Assignee: Solvay & Cie, Brussels, Belgium

[21] Appl. No.: 37,049

[22] Filed: May 8, 1979

[30] Foreign Application Priority Data

May 8, 1978 [FR] France ................................ 78 13803
Jul. 17, 1978 [FR] France ................................ 78 21349

[51] Int. Cl.³ ...................... B32B 23/08; B32B 27/06; B32B 27/10
[52] U.S. Cl. .................................... 428/246; 428/252; 428/423.1; 428/424.2; 428/507; 428/511; 428/513; 428/516; 428/904
[58] Field of Search ............... 428/509, 500, 507, 508, 428/513, 515, 516, 511, 512, 246, 252, 904, 423.1, 424.2

[56] References Cited

U.S. PATENT DOCUMENTS 4,092,457 5/1978 Fujita et al. .................... 428/512 X

FOREIGN PATENT DOCUMENTS 1241981 4/1969 Fed. Rep. of Germany .

OTHER PUBLICATIONS

Modern Plastics International, Feb. 1974, pp. 22–24.

Primary Examiner—Thomas J. Herbert, Jr.
Attorney, Agent, or Firm—Spencer & Kaye

[57] ABSTRACT

A laminated structure suitable for use for the interior decorating of buildings and for motor vehicle upholstery comprising at least one decorative layer of organic material, which is combined, by hot pressing, with a support consisting of a polyolefin sheet, in which the polyolefin sheet comprises from 10 to 90% by weight of cellulose fibres and from 90 to 10% by weight of a polyolefin which is modified by polar monomeric units derived from at least one monomer chosen from the group consisting of unsaturated carboxylic acids, the corresponding anhydrides and derivatives thereof.

22 Claims, No Drawings

LAMINATED STRUCTURE FOR FURNISHING, COMPRISING AT LEAST ONE DECORATIVE LAYER COMBINED WITH A SUPPORT

The present invention relates to a laminated structure comprising at least one decorative layer, of organic nature, which is combined, by hot pressing, with a support consisting of a polyolefine sheet.

It has already been proposed, in German Pat. No. 1,241,981, filed on Feb. 13, 1965 in the name of RUHR-CHEMIE A. G., to produce sheets or profiles from mixtures of polyolefines and wood particles. Such materials can be calendered or shaped by hot pressing.

Furthermore, it has also been proposed to produce, from such materials, furnishing elements such as upholstery elements for motor vehicles. In this type of application, the element can advantageously be covered with a decorative sheet consisting, for example, of a cellular sheet of polyvinyl chloride or a non-woven textile (Modern Plastics International, 1974, February, pages 22–24). The fixing of the decorative covering is generally ensured by sticking with an acrylic or neoprene adhesive. However, the use of these adhesives exhibits certain disadvantages. Thus, the adhesive must be judiciously chosen so as to withstand the heat treatments required in order to ensure the shaping of the element. Moreover, their use also requires the use of special devices for removing or recovering the solvents if the latter are toxic or simply expensive. Finally, the production of decorated furnishing elements in accordance with these techniques involves a successive series of operations (application of the adhesive, application of the covering, drying, recovery of the solvents and shaping), which substantially increases the cost price of the articles thus produced.

It has now been found that it is possible to produce such furnishing elements, in which the adhesion between the constituent elements is remarkable, whilst avoiding the use of an adhesive and employing a technique and materials which are less elaborate than those used in the known processes.

The present invention therefore relates to a laminated structure for furnishing, comprising at least one decorative layer, of organic nature, which is combined, by hot pressing, with a support consisting of a polyolefine sheet, in which structure the polyolefine sheet comprises from 10 to 90% by weight of a polyolefine which is modified by polar monomeric units derived from at least one monomer chosen from the group comprising unsaturated carboxylic acids, the corresponding anhydrides and derivatives thereof.

The term "polyolefine modified by polar monomeric units" as defined above is understood as denoting any polyolefine in which at least some macromolecules contain, in addition to monomeric units derived from unsubstituted alphaolefines, polar monomeric units corresponding to the definition stated above. Although the presence, in the modified polyolefine, of monomeric units other than those mentioned above is not excluded, the polyolefine is nevertheless preferably composed exclusively of monomeric units of the two abovementioned kinds.

These modified polyolefines can be copolymers of at least one alpha-olefine and at least one polar monomer. These copolymers can be statistical, graft or block copolymers. However, preference is given to graft copolymers in which the main chain (or skeleton) has a polyolefinic structure and the side chains (or grafts) consist of polar monomers. The graft copolymers can be manufactured by any known grafting technique such as grafting in solution, by irradiation or in the presence of initiators, and grafting by malaxation in the molten state.

The alpha-olefines from which the olefinic monomeric units of the modified polyolefines are derived can be chosen from amongst all the unsubstituted olefines having a double bond in the alpha-position. In general, they are chosen from amongst monoolefines having from 2 to 6 carbon atoms in their molecule, such as ethylene, propylene, 1-butene and 4-methyl-1-pentene.

Moreover, the modified polyolefines can contain several different alpha-olefines.

The polar monomer employed in order to obtain the modified polyolefines can be any organic compound containing at least one double bond and at least one carboxylic acid group optionally in the form of an anhydride. Polar monomers containing from 4 to 12 carbon atoms in their molecule are preferably used. These polar monomers can be, in particular, an acrylic or methacrylic monomer, such as acrylic acid, methacrylic acid and alpha-chloroacrylic acid, or an unsaturated polycarboxylic acid, such as maleic acid, fumaric acid and itaconic acid, or an anhydride derived from these acids.

In general, the modified polyolefines contain from 0.1 to 5 g/kg of monomeric units derived from the polar monomer, and preferably from 0.2 to 2 g/kg.

The modified polyolefines can also contain macromolecules which are free from polar monomeric units. However, it is preferred that the proportion of such molecules is less than 50% by weight, and more particularly less than 25% by weight, of all the polyolefines present.

The modified polyolefines can contain various additives which are usually added to polyolefines, such as fillers, in particular inorganic fillers, stabilizers, lubricants, anti-acid agents, agents for improving the impact strength, colourants and the like. These additives are generally present in amounts of less than 50% by weight, and frequently less than 10% by weight, of the polyolefine.

Particularly advantageous results are obtained with high-density polyethylenes, or with polypropylenes, which are modified by grafting and which contain monomeric units derived from maleic anhydride.

The polyolefine can be employed in any form during the production of the laminated structure. Thus, it can be in the form of a powder or in the form of granules. However, it has been found that it is possible to produce laminated structures, according to the invention, which possess a relatively low density, for example of about 0.4 to 0.8 dm$^3$/kg, if the polyolefine is employed in the form of fibrillar structures.

The term "fibrillar structures" is understood as denoting elongate structures consisting of very thin filaments, having a thickness of the order of one micron, which are connected to one another so as to form a three-dimensional network. These fibrillar structures, of flakey appearance, have a diameter of about 0.01 to 5 mm, a length of 0.1 to 50 mm and a specific surface area of at least 1 m$^2$/g and preferably at least 10 m$^2$/g.

These structures can be obtained in accordance with any process and, in particular, by using the processes described in Belgian Pat. No. 568,524, filed on June 11, 1958 by E. I. du PONT de NEMOURS, in Belgian Pat.

No. 789,804, filed on Oct. 10, 1972 by CROWN ZELLERBACH INTERNATIONAL, in German Patent Application No. 2,252,758, filed on Oct. 27, 1972 by GULF RESEARCH and DEVELOPMENT, in German Patent Application No. 1,951,609, filed on Feb. 23, 1973 by MONTECATINI EDISON, in German Patent Application No. 2,144,409, filed on Sept. 4, 1971 by OJI YUKA GOSEISHI, in Japanese Patent Application No. 7,232,133, filed on Sept. 19, 1969 by TORAY, or also in Belgian Pat. Nos. 742,358 of Nov. 12, 1969, 787,032 and 787,033 of Aug. 1, 1972, 811,780 of Mar. 1, 1974 and 824,844 of Jan. 17, 1975 in the name of the Assignee of the present invention.

If the structures are obtained in the form of continuous fibrillar structures, it is obviously appropriate to provide a cutting or shredding operation, for example in a pulper, in order to reduce their length within the abovementioned limits.

The fibrillar structures can advantageously consist of the graft copolymer. The latter can be manufactured in accordance with various techniques. Thus, according to a first variant, the techniques described in the abovementioned patents can be employed, using a copolymer which has been grafted beforehand. According to another variant, the fibrillar structures are produced by the sudden expansion of a mixture of molten polyolefines and solvent, and the polar monomer is grafted, a posteriori, onto the fibrillar polyolefine structures thus produced, by employing, for example, the technique described in French Pat. No. 1,236,686, filed on Aug. 19, 1959 by E. I. du PONT de NEMOURS. Finally, according to a third variant to which preference is given, the fibrillar structures are produced directly by the sudden expansion of a mixture of molten polyolefine and solvent, which contains the polar monomer and a free radical generator, as described in Luxembourg Patent Application No. 73,706, filed on Nov. 3, 1975 by the Assignee of the present invention. The conditions prevailing before the expansion are suitable for causing the desired grafting.

According to the invention, the polyolefine sheet combined with the decorative layer of organic nature contains from 10 to 90% by weight of cellulose fibres. If the polyolefine sheet contains less than 10 by weight of modified polyolefine, it is no longer possible to obtain an excellent bond. The adhesion between the constituent elements of the structure increases as a function of the proportion of modified polyolefine, up to a proportion of about 40%, and then remains virtually constant. In order to obtain an excellent adhesion between the constituent elements of the structure, it is not therefore necessary to employ an amount of modified polyolefine which exceeds about 40% by weight. Finally, the polyolefine sheets can be deformed by the action of pressure and heat if the proportion of modified polyolefine reaches at least 35% by weight. The thermodeformability of the sheets also increases with the proportion of modified polyolefine therein.

As a result, for the production of laminated structures which do not have to undergo any subsequent thermoforming, it is advantageous, for economic reasons, to choose the proportion of modified polyolefine between 10 and 40% by weight, and, for the production of laminated structures which do have to undergo a thermoforming, the proportion of modified polyolefine is advantageously more than 35% by weight, it being possible for this proportion to reach 90% for certain applications.

According to one modified embodiment, the polyolefine sheet is combined, by one of its faces, with the decorative layer of organic nature, and by the other face, with a base sheet made from a mixture of cellulose fibers and one or more polyolefines which are free from polar monomeric units. The base sheet can itself be combined with a second polyolefine sheet which is combined with a second decorative layer of organic nature. A composite structure is thus obtained which comprises a core formed by the base sheet, two intercalated polyolefine sheets on either side of the core and two decorative covering layers of organic nature. In this case, the polyolefine constituting the base sheet and the polyolefine constituting the covering sheets are preferably based on the same alpha-olefines. The intercalated polyolefine sheets preferably having a weight between 25 and 250 g/m$^2$.

The various techniques for converting the mixtures of cellulose fibres and polyolefines into sheets are well known to the specialists and can all be employed for producing the polyolefine sheet. Thus, the polyolefine sheet can be prepared, for example, by a dry method, in particular by the techniques of web formation of pneumatic means or by gravity, malaxating-calendering and extrusion. It is also possible to employ the conventional papermaking method which consists in forming the sheet from a suspension in a liquid containing the appropriate mixture of cellulose fibres and polyolefine in proportions such that the concentration of solids in the suspension is between 1 and 20% by weight. This procedure proves very simple and makes it possible to employ equipment which is already in existence, for example in cardboard factories. The preferred liquid for forming the suspension is water, in particular for obvious economic reasons. However, it is possible to envisage the use of other liquids for forming the suspension, such as, for example, chlorinated solvents.

According to the preferred procedure, if the polyolefine is employed in the form of fibrillar structures, the process starts by suspending the fibrillar structures in water, these structures being present in the form of a web, it being possible for this suspending operation to be facilitated by the simultaneous or prior introduction of a small amount of cellulose fibres. The suspension is then subjected to an energetic grinding treatment, for example in equipment of the TURMIX type, so as to individualise the fibrils to the maximum extent, the cellulose fibres are then incorporated and the mixture is homogenized before carrying out the formation of a sheet on a papermaking machine. The sheet thus produced is advantageously drained, dried at about 90° C. so as to remove virtually all the water, and then consolidated by heating, for example at between 175° and 190° C. under a pressure of 10 to 150 kg/cm$^2$.

The cellulose fibres forming part of the composition of the polyolefine sheet can be employed in any form which is sufficiently finely divided. Thus, it is possible to employ particles or fibres of deciduous or conifer wood, sawdust, waste wood wool, paper pulp and shredded waste paper for preparing the mixture.

The decorative layer or layers of organic nature can be of any type. Thus, the decorative layer or layers can consist of:

a film or sheet of a plastic such as a polyvinyl chloride, a polyether, a polyolefine, a polyurethane, an acrylic resin or a resin based on urea-formaldehyde or on melamine, it being possible for the film or sheet to be partially or totally of cellular structure, a textile, which may or may not be woven, made of natural fibres (wool, cotton and the like) or synthetic fibres, which textile is optionally coated on the visible face with a layer of a plastic such as those mentioned above, it being possible for this layer to be partially or totally of cellular structure, a cellulose paper or a partially or totally synthetic paper, such as a paper produced from polyolefine fibres, it also being possible for this paper to be coated with a layer of a plastic such as those mentioned above, and it being possible for the said layer to be partially or totally of cellular structure, and a thin sheet of veneer, this list being given by way of enumeration and without implying a limitation.

The decorative layer can receive an impression by any known means. It can also be grained on the surface.

If the laminated structure is required to have to undergo a significant deformation in order to produce the desired finished article, it is obviously appropriate judiciously to choose the nature of the decorative covering layer or layers in such a way that the latter can undergo the necessary deformations without damage.

According to a procedure which is preferred because it leads to a further improved adhesion between the constituents of the laminated structure, the decorative layer consists of a textile containing polyolefine fibres, which is covered on its visible face with a layer of plastic.

The presence of the textile containing polyolefine fibres in fact makes it possible, during the combining operation by hot pressing, to obtain a remarkable bond between the support and the decorative layer, which bond is probably due to the natural compatibility between the polyolefine forming part of the constitution of the support and the polyolefine in the fibres forming part of the constitution of the textile which is brought into direct contact with the support.

The structure of the textile forming an integral part of the decorative layer is in no way critical and a woven textile, a knitted textile or also a non-woven textile can be used as desired.

Likewise, the textile can be made totally or partially from polyolefine fibres. However, in the latter case, it is generally preferred for the textile to contain at least 10% by weight, and preferably at least 20% by weight, of polyolefine fibres, it being possible for the remainder to consist of any natural or synthetic fibres.

The nature of the polyolefine fibres forming part of the constitution of the textile is in no way critical. Thus, it is possible to use fibres produced from polyethylene, polypropylene, copolymers based on ethylene or copolymers based on propylene. However, it can prove advantageous to introduce, into the constitution of the textile, polyolefine fibres which are produced from a polyolefine of the same nature as that employed for producing the support of the laminated structure. Furthermore, it is possible to obtain excellent results, from the point of view of the adhesion between the constituents of the laminated structure, by producing the textile totally or partially from polyolefine fibres which have been subjected beforehand to a treatment for the purpose of grafting, to these fibres, polar monomeric units derived from at least one monomer chosen from the group comprising unsaturated carboxylic acids, the corresponding anhydrides and derivatives thereof. Furthermore, this latter grafting treatment can be effected directly on the textile or on that face of the textile which is required to be brought into contact with the support during the assembling of the laminated structure.

The layer of plastic deposited on the textile can be of any nature, preference being given to vinyl plastics, such as resins based on vinyl chloride, and to polyurethane-based resins of dense or cellular structure. In general, preference is given to plastics which are at least partially of cellular structure. This layer can be deposited on the textile beforehand by any known technique such as, for example, coating, melt coating, lamination and the like. This layer can obviously be decorated on its visible surface, in particular in order to impart the appearance of an artificial leather thereto.

The laminated structure according to the invention is produced, without employing any adhesives, by simply hot-pressing the decorative layer or layers onto the polyolefine sheet, the temperature during this pressing being 120° to 250° C., and preferably 140° to 200° C., and the pressure exerted being of the order of 0.1 to 100 $kg/cm^2$ and preferably 0.1 to 50 $kg/cm^2$. The laminated structure is cooled under pressure and it is not withdrawn from the mould until the temperature of this structure is less than 120° C. and preferably less than 90° C.

According to a preferred procedure, the laminated structure is obtained by depositing the optionally preheated decorative layer or layers on the polyolefine sheet, which has been heated beforehand to a temperature ranging from 120° to 250° C., and preferably from 140° to 200° C., for example by means of infrared radiators, and by pressing the combination between cold elements until this combination has cooled to a temperature below 120° C. and preferably below 90° C.

The pressing operation can advantageously be utilised to impart, to the structure, the shape desired for the purpose of its subsequent use. It is also appropriate to note that the preheating of the polyolefine sheet does not present any particular problem because it has been found that the polyolefine sheets according to the invention possess a heat resistance which is substantially greater than that of the sheets consisting of a mixture of cellulose fibres and unmodified polyolefine.

The structure can be assembled discontinuously or semi-continuously by means of fixed or moving presses.

The adhesion between the constituent elements of the laminated structure according to the invention is remarkable. It is relatively insensitive to temperature variations; the structure can withstand temperatures of the order of 110° C. just as well as temperatures below −40° C. Moreover, it has been found, surprisingly, that the presence of cellulose fibres in the polyolefine sheet has the effect of enhancing this adhesion. Thus, it has been found that the adhesion between the polyolefine sheet and the decorative layer or layers is poorer when the polyolefine sheet does not contain cellulose fibres.

The laminated structure according to the invention can easily be subjected to subsequent mechanical operations such as embossing, chamfering, drilling, milling, riveting and tapping.

In particular, it is especially suitable for cold deformation treatments, such as bending, deflecting and relatively shallow stamping, if the polyolefine sheet is produced from a synthetic elastomer such as, for example, a rubbery copolymer based on ethylene and propylene.

The laminated structure according to the invention can be used in numerous applications, in particular in the field of the interior decorating of buildinggs and in the field of motor vehicle upholstery.

In order to demonstrate the improvement in the adhesion found in the laminated structure according to the invention, the following three tests were carried out. Test 3 relates to a laminated structure according to the invention and, in this respect, it therefore illustrates the invention without of course thereby restricting the scope thereof.

EXAMPLE 1 (comparison example)

A 100 mm square sample is cut from a 2½ mm thick sheet prepared from a mixture comprising 50 parts by weight of high-density polyethylene and 50 parts by weight of D40-80 sawdust (mixture of spruce and poplar sawdust of which the particles have a mean diameter of 280 microns) and is introduced into a static oven heated by infrared rays.

After 120 seconds, the sample is withdrawn from the oven and its temperature is found to be 175° C.

A sheet of snythetic leather made of a flexible polyurethane foam is deposited on the sample and the whole is place between the platens of a cold press.

A pressure of 1 kg/cm$^2$ is applied for the time required to bring the structure to a temperature of 60° C. The press is opened, the sample is withdrawn and the covering of synthetic leather is subjected to a peel test.

It is found that the sheet of synthetic leather adheres poorly to the support sheet. The loss of material recorded for the synthetic leather is 52 g per m$^2$.

EXAMPLE 2 (comparison example)

The procedure is exactly as in the preceding example, except that the sheet consists solely of high-density polyethylene which has been grafted beforehand with maleic anhydride, the proportion of the latter constituent being 0.4 g/kg.

In the peel test, it is found that the sheet of synthetic leather adheres very poorly to the support. The loss of material recorded for the synthetic leather is 32 g per m$^2$.

EXAMPLE 3

The procedure is exactly as in Example 2, except that the sheet is prepared from 50 parts by weight of high-density polyethylene, which has been grafted with maleic anhydride as described in Example 2, and 50 parts by weight of D40-80 sawdust.

In the peel test, it is found that the sheet of synthetic leather adheres strongly to the support. The loss of material recorded for the synthetic leather is 93 g per m$^2$.

We claim:

1. A laminated structure comprising at least one decorative layer, of organic nature, which layer is selected from the group consisting of plastic films and sheets, textiles, papers and sheets of veneer, and which layer is combined, by hot pressing, with a support comprising a polyolefine sheet, wherein the polyolefine sheet comprises from 10 to 90% by weight of cellulose fibres and from 90 to 10% by weight of a polyolefine which is modified by polar monomeric units derived from at least one monomer selected from the group consisting of unsaturated carboxylic acids, the corresponding anhydrides and derivatives thereof.

2. A laminated structure according to claim 1, wherein said modified polyolefine is in the form of fibrillar structures.

3. A laminated structure according to claim 1, wherein said modified polyolefine is a copolymer of at least one alpha-olefine and at least one polar monomer.

4. A laminated structure according to claim 3, wherein said modified polyolefine contains monomeric units derived from unsubstituted alpha-olefines selected from the group consisting of mono-olefines having from 2 to 6 carbon atoms.

5. A laminated structure according to claim 3, wherein said monomer is selected from the group consisting of acrylic monomers, methacrylic monomers, unsaturated polycarboxylic acids and the corresponding anhydrides thereof.

6. A laminated structure according to claim 3, wherein said modified polyolefine is selected from the group consisting of a high-density polyethylene and a polypropylene, and wherein said monomer is maleic anhydride.

7. A laminated structure according to claim 3, wherein said modified polyolefine is in the form of fibrillar structures.

8. A laminated structure according to claim 3, wherein said copolymer is a graft copolymer in which the main chain has a polyolefinic structure and the side chains consist of polar monomers.

9. A laminated structure according to claim 8, wherein said modified polyolefine contains monomeric units derived from unsubstituted alpha-olefines selected from the group consisting of mono-olefines having from 2 to 6 carbon atoms.

10. A laminated structure according to claim 8, wherein said monomer is selected from the group consisting of acrylic monomers, methacrylic monomers, unsaturated polycarboxylic acids and the corresponding anhydrides thereof.

11. A laminated structure according to claim 8, wherein said modified polyolefine is selected from the group consisting of a high-density polyethylene and a polypropylene, and wherein said monomer is maleic anhydride.

12. A laminated structure according to claim 8, wherein said modified polyolefine is in the form of fibrillar structures.

13. A laminated structure according to claim 1, wherein said modified polyolefine contains monomeric units derived from unsubstituted alpha-olefines selected from the group consisting of mono-olefines having from 2 to 6 carbon atoms.

14. A laminated structure according to claim 13, wherein said monomer is selected from the group consisting of acrylic monomers, methacrylic monomers, unsaturated polycarboxylic acids and the corresponding anhydrides thereof.

15. A laminated structure according to claim 13, wherein said modified polyolefine is selected from the group consisting of a high-density polyethylene and a polypropylene, and wherein said monomer is maleic anhydride.

16. A laminated structure according to claim 13, wherein said modified polyolefine is in the form of fibrillar structures.

17. A laminated structure according to claim 1, wherein the decorative layer consists of a textile containing polyolefine fibres, which textile is covered on its visible face with a layer of a plastic selected from the group consisting of vinyl resins and polyurethane resins.

18. A laminated structure according to claim 17, wherein the layer of plastic is at least partially of cellular structure.

19. A laminated structure according to claim 1, wherein said monomer is selected from the group consisting of acrylic monomers, methacrylic monomers, unsaturated polycarboxylic acids and the corresponding anhydrides thereof.

20. A laminated structure according to claim 19, wherein said modified polyolefine is in the form of fibrillar structures.

21. A laminated structure according to claim 19, wherein said modified polyolefine is selected from the group consisting of a high-density polyethylene and a polypropylene, and wherein said monomer is maleic anhydride.

22. A laminated structure according to claim 21, wherein said modified polyolefine is in the form of fibrillar structures.

* * * * *